United States Patent [19]

Krause

[11] 4,135,305
[45] Jan. 23, 1979

[54] INDEXING DEVICE

[76] Inventor: Raymond Krause, 6815 Hollywood Dr., Parma, Ohio 44129

[21] Appl. No.: 832,944

[22] Filed: Sep. 13, 1977

[51] Int. Cl.² .............................................. G01B 5/00
[52] U.S. Cl. .............................................. 33/174 TD
[58] Field of Search ..... 33/174 TA, 174 TB, 174 TC, 33/174 TD

[56] References Cited

U.S. PATENT DOCUMENTS 3,049,193  8/1962  Ingersoll ........................ 33/174 TC
3,063,155  11/1962  Prefontaine ..................... 33/174 TC Primary Examiner—Richard E. Aegerter
Assistant Examiner—Willis Little
Attorney, Agent, or Firm—M. Ted Raptes

[57] ABSTRACT

An indexing device for obtaining and maintaining the desired rotation of an electrode in an electric discharge machining apparatus wherein the coarse annular adjustment of the electrode is accomplished by manually aligning indexing scale lines with a reference line, and then effecting a fine adjustment by means of a reverse reading micrometer.

5 Claims, 5 Drawing Figures

INDEXING DEVICE

SUMMARY OF THE INVENTION

In electric discharge machining operations, one of the most difficult functions is to properly locate and position the machining electrode when more than one machining operation is required to achieve the desired shape or configuration in the work piece.

It is an object of the invention to produce an indexing device for use with an electric discharge machining apparatus which can be readily affixed to existing apparatus.

Another object of the invention is to produce an indexing device for electric discharge machining apparatus which may be attached to spindle thereof, and achieve highly accurate indexing functions of the associated electrode with minimal shut-down time between adjustments.

The above, as well as other objects of the invention may be achieved by an indexing device, including a base having an aperture formed therein; a disc having an annular opening, and an annular array of apertures formed about the annular opening; means for securing the disc to the base whereby the aperture in the base and the opening in the disc are aligned, and permitting limited relative movement between the disc and the base about the center axes of the aperture in the base, and the opening in the disc; a spindle extension having an extended body portion and a radially outwardly flaring flange portion receivable within the annular opening of the disc; a plate having an opening therein, and at least two arcuate slots spaced about the opening; fastener means extending through the slots in the plate for securing the plate to the spindle extension; positioning means associated with the plate and adapted to align with selective ones of the apertures in the annular array in the disc whereupon coarse adjustments may be made by releasing the positioning means and effecting relative movement between the plate and the disc to rotate the spindle extension; and micrometer means for effecting movement of the disc, plate and spindle extension relative to the base to obtain fine adjustment.

DESCRIPTION OF THE DRAWINGS

The above, as well as other objects and advantages of the invention, will become readily apparent to one skilled in the art from reading the following detailed description of an embodiment of the invention when considered in the light of the following drawings, in which.

DETAILED DESCRIPTION OF THE EMBODIMENT OF THE INVENTION

Figure 1:
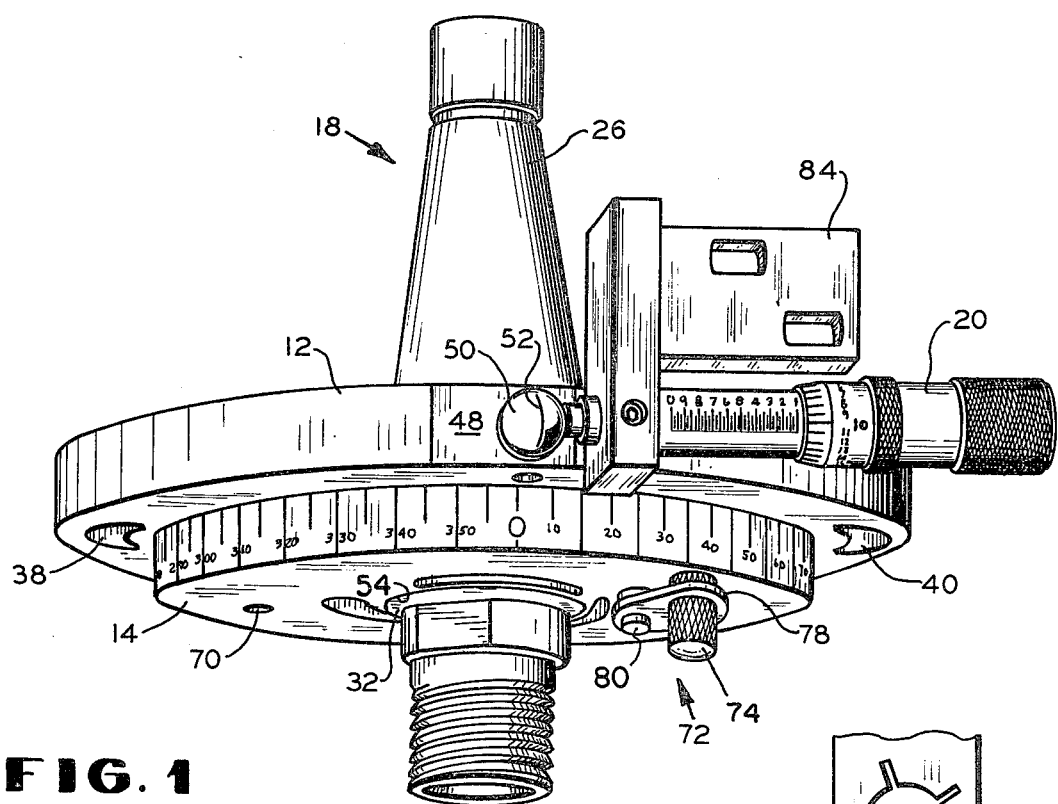
FIG. 1 is a perspective view of the device constructed in accordance with the present invention.

Referring to the drawings, there is shown in FIGS. 1, 2, 3, and 4 a rotary sine indexing device, particularly useful for maintaining and controlling the position of an electrode for an electric discharge machining apparatus, which includes a base or platen 10 (for sake of clarity not shown in FIG. 1), a sine disc 12, an index plate 14, a spindle and collet chuck assembly 18, and a micrometer 20.

The base or platen 10 is provided with a central aperture or opening 22 which is adapted to align with the spindle of an associated electric discharge machining apparatus and is secured to the apparatus in any of the well known methods. The base 10 is provided with a number of parallel spaced apart guideways 24, generally T-shaped in cross-section, and opening in the bottom surface thereof. At least the centermost guideway 24 is formed to, in effect, bisect the center of the opening 22.

The spindle and collet chuck assembly 18 is generally cylindrical in shape and has a tapered portion 26, which mates with the internal taper of a chuck assembly on the associated electrical discharge machine to provide the desired concentricity between the machining apparatus chuck and the spindle assembly 18. At the base of the tapered portion 26 and of the spindle and collet chuck assembly 18 is a radially outwardly extending flange 28, having an annular array of equi-distantly spaced internally threaded holes 30 formed therein. A reduced diameter cylindrical collet chuck portion 32 extending downwardly from the flange section 28 is adapted to maintain the shank of an appropriately shaped machining electrode (not shown).

It is deemed preferable that the spindle and collet chuck assembly 18 is hollow throughout its length to provide a passageway for a dielectric oil flush emanating from the associated machine.

A sine disc 12, having a central annular aperture or opening 34, is positioned to have a major surface thereof in adjacent abutting relationship to the undersurface of the base 10. The central opening 34 is aligned with the center line of cylindrical spindle and collet chuck assembly 18. The disc 12 is also provided with an annular array of thirty-six (36) holes formed therein concentrically about the opening 34, and spaced apart with their centers displaced from one another ten (10°) degrees. A pair of diametrically opposed arcuate counterbored slots 38 and 40 spanning approximately twelve (12°) degrees is formed in the outer peripheral wall area of the disc 12.

In order to fasten or secure the disc 12 to the base 10, T-shaped nuts 42 are disposed in the T-shaped slot or guideway 24, and are adapted to receive threaded fasteners 44 and 46, respectively. While the threaded fasteners 44 and 46 may be of a number of designs, it has been found that Allen head type socket heads have been successful in use.

The disc 12 is further provided with a flat section 48, formed along a peripheral circumferential edge portion. A spherical tooling member 50 is suitably secured to the flat portion 48, and is aligned such that a line 52 scribed thereon is in line with the center of an adjacent one of the holes 36, and the center of the spindle and collet chuck assembly 18.

The structure further includes the index plate 14, which is provided with a central annular opening 54 and a series of circumferentially spaced apart counterbored slots 56, 58, and 60. The index plate 14 has its upper surface in juxaposition to the lower exposed surface of the disc 12 such that the center of the annular opening 54 is in alignment with the center of the spindle and collet chuck assembly 18. This relative position is maintained by a series of threaded fasteners 62, 64, and 66 having Allen head socket heads, for example, being received in the slots 56, 58 and 60, respectively. The threaded shanks of the fasteners 62, 64, and 66 are threadably received within suitably respectively aligned internally threaded holes 30 in the flange 28 of the spindle and collet chuck assembly 18.

The indexing plate 14 is provided with a pair of diametrically opposed holes 68 and 70, whose centers are aligned with the centers of the holes 36 in the disc 12.

A locator pin 72 having a head 74 with a knurled external surface, and a recessed circumferential groove 76 formed therein is adapted to maintain the desired indexing relationship of the plate and the associated spindle and collet assembly 18, and the disc 12. As will be explained in greater detail hereinafter, the coarse adjustment of the assembly is achieved by initially rotating the indexing plate 14 relative to the disc 16 to the closest ten (10°) degrees wherein the diametrically opposed holes 68 and 70 are caused to align with respective ones of the annular array of holes 36. At this point, the pin 72 is inserted into the hole 68 and an aligned one of the holes 36 and is held in such position by means of a swing clamp 78, which swings about a pivot point 80 secured to the indexing plate 14.

To further secure the indexing plate 14 from any relative rotation, an auxiliary pin 82 is inserted to extend through the hole 70 in the indexing plate 14, the aligned one of the holes 36 in the disc 12, and thence in a suitable hole drilled in the base 10. Manifestly, the pin 82 is used only when zero indexing of the assembly is desired on a continuous basis.

The reverse reading micrometer 20 is affixed to the side of the base or platen 10 by means of a retainer or positioning bracket 84. The bracket 84 is typically secured to the side of the base 10 by a pair of threaded fasteners 86, which accurately locates and positions the end of the micrometer 20 with respect to the spherical tooling member 50.

In the operation of the apparatus described in the foregoing description, initially the spindle and collet chuck assembly 18 is inserted into the spindle of an associated electric discharge machining apparatus spindle and securely locked therein. The disc 12 of slipped over the flange 28, and securely bolted in place by means of the threaded fasteners 44 and 46, which are adapted to be received by the T-nuts 42 in the T-shaped guideway 24 of the base or platen 16. Next, the index plate 14 is slipped over the spindle and collet chuck assembly 18 and secured in juxtaposition against the lower surface of the disc 12 by means of a plurality of threaded fasteners 62, 64 and 66, which extend through the arcuate slots 56, 58 and 60, respectively. Before the threaded fasteners are tightly secured, the indexing plate 14 is positioned such that the zero (0°) degree marking on the indicia on the side wall thereof is in direct alignment with the line 52 of the spherical tooling member 50. Once such alignment is achieved, the threaded fasteners 62, 64 and 66 are tightened to maintain this desired relationship.

The micrometer 84 and its associated bracket 86 are then properly positioned against the side walls of the platen 10 such with the micrometer setting at zero (0°) degrees with the end thereof butted against the spherical tooling ball 50. Finally, the locator pin 72 and the auxiliary pin 82 are positioned in their respective apertures to insure the radial alignment of sine disc 12 and the spindle and collet chuck assembly 18.

While other diminsions could be satisfactorily employed it has been found that a four (4") inch rotary sine principal has been highly effective to achieve highly accurate indexing functions. The specific dimension employed is to place the scribed line 52 four (4") inches from the centerline of the shank and rolled chuck extension 18.

Figure 5:
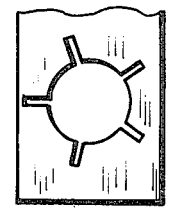
FIG. 5 is a plane view of a machined workpiece.
Figure 2:
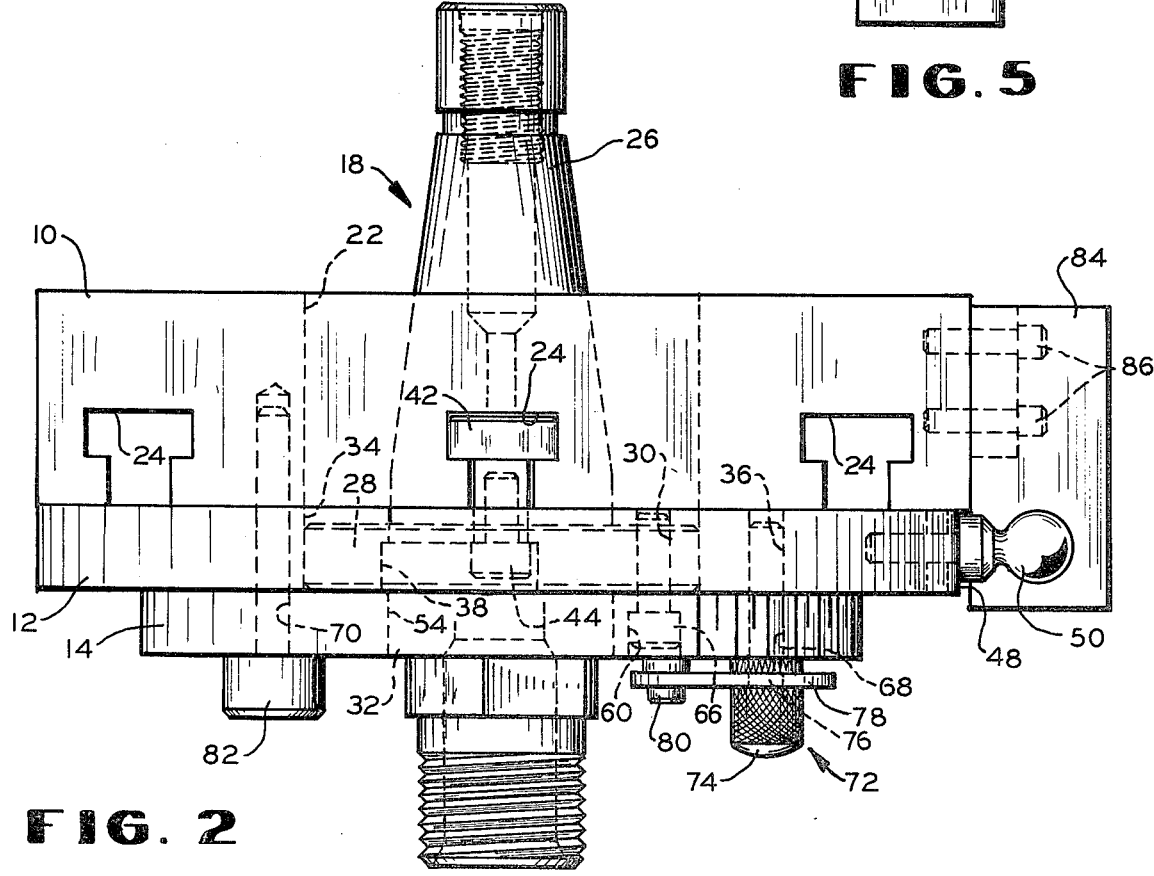
FIG. 2 is an end view of the device illustrated in FIG. 1 taken from the left in FIG. 1.
Figure 3:
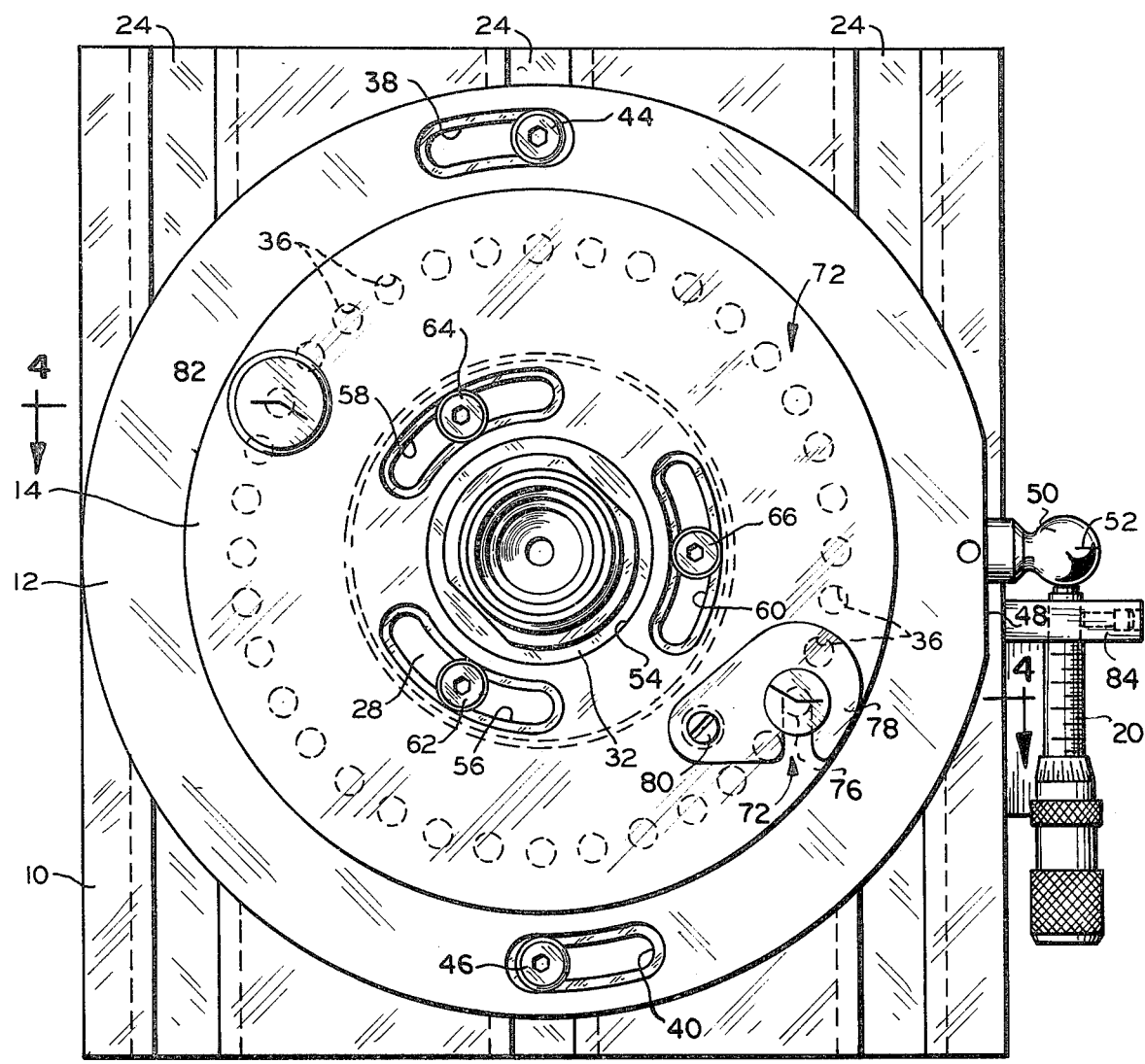
FIG. 3 is a bottom plane view of the device illustrated in FIG. 1.

To operate the device thus far described, let it be assumed that it is planned to form an aperture in a metal plate having a configuration of that illustrated in FIG. 5. The previous method for achieving such a configuration with an electric discharge machining apparatus was to form an electrode for the apparatus having the exact size and configuration of the finished aperture. Manifestly, such a procedure was very costly. The process utilizing the apparatus of the invention would require only a single flat blade type electrode, and a single cylindrical electrode. Typically, the cylindrical electrode is first used to machine a circular hole in the work piece. Then, the flat blade electrode is positioned with respect to the work piece by being suitably held in electrode holder secured to the lower end of the spindle and collet chuck assembly 18 and the first slot is disintegrated. The second slot is to be formed in the work piece at seventy-two (72°) degrees from the first formed slot. The positioning of the electrode for achieving this machining operation is achieved by removing the positioning and locator pins 72 and 82, rotating the indexing plate seventy (70°) degrees and the locator pin 72 is reinserted into the associated aligned holes and the swing clamp 78 is swung to engage the groove 76 of the pin. The threaded fasteners 46 and 44 of the disc 12 are loosened and the entire assembly of disc 12, indexing plate 14, and the spindle and collet chuck assembly 18 is rotated clockwise. Then the micrometer head 20 is set at 0.1396 inches and the disc 12 is rotated in a counterclockwise position to bring the spherical tooling member 50 back to butt against the face of the micrometer 20 and the threaded fasteners 42 and 44 are secured. The dimension of 0.1396 inches is the sine of two degrees on a four (4) inch arc.

Figure 4:
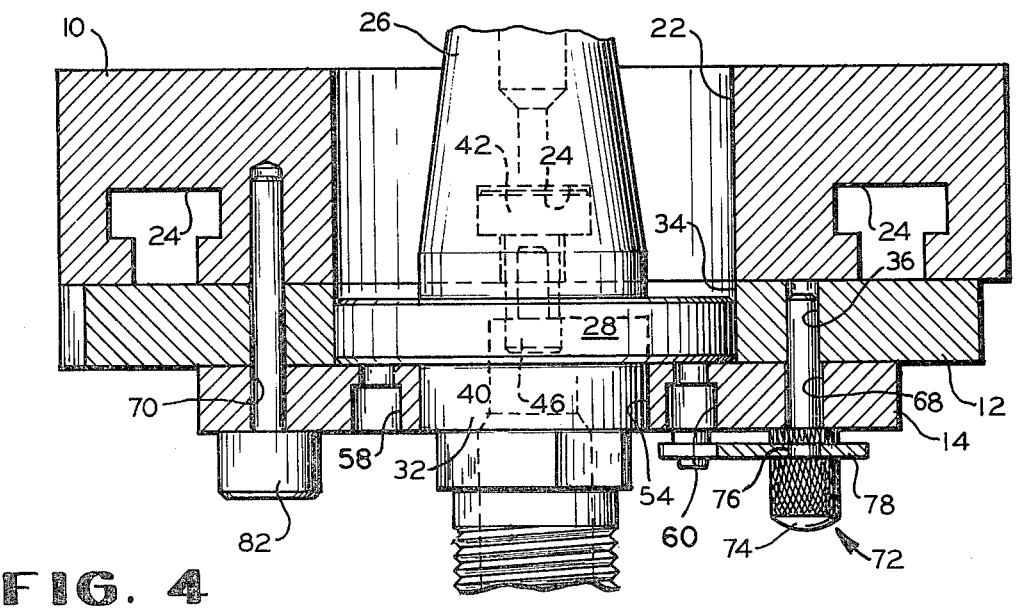
FIG. 4 is a sectional view of the device illustrated in FIGS. 1, 2 and 3 taken along line 4—4 of FIG. 3.

To locate the third slot, in a manner similar to that explained hereinabove, the index plate 14 is rotated to one hundred forty (140°) degrees and suitably positioned. The micrometer head 20 is reset at 0.2790 inches, the sine of four (4°) degrees on a four (4") inch arc, and the procedure is completed. To complete the cycle, settings are to be made for two hundred sixteen (216°) degrees and two hundred eighty-eight (288°) degrees in a fashion similar to that explained hereinbefore. The above procedure is regarded to be very simple and highly accurate. In actual operation, to form the aperture, as shown in FIG. 4, required approximately six (6) hours to prepare, including the time for fabricating the specifically shaped electrode and accomplishing the machining operation. With the apparatus which forms the basis of this invention, the structure of FIG. 4 was accomplished in approximately one-half an hour, resulting in considerable time saving over the former method.

What is claimed is:

1. A rotary sine indexing device for attachment to a spindle comprising:
   a base having an aperture formed therein;
   a disc having an annular opening and an annular array of apertures formed about said annular opening;
   means for securing said disc to said base whereby the aperture is said base and the opening in said disc are aligned, and permitting limited relative movement between said disc and said base about the center axes of the aperture in said base and the opening in said disc;

a spindle extension having an extended body portion and a radially outwardly flaring flange portion, said flange portion receivable within the annular opening of said disc;

a plate having an opening therein and at least two arcuate slots spaced about the opening;

fastener means extending through the slots in said plate for securing said plate to said spindle extension;

positioning means associated with said plate and adapted to align with selective ones of the apertures of the annular array in said disc whereupon coarse adjustment may be made by releasing said positioning means and effecting relative movement between said plate and said disc to rotate said spindle extension; and micrometer means for effecting fine adjustment of said disc, plate and spindle extension relative to said base.

2. A rotary sine indexing device for attachment to a spindle extension comprising:

a spindle extension rotatable about its longitudinal axis;

disc means secured for limited relative movement concentrically about said extension;

plate means secured to and concentric with said extension and having indicia representing the segments of a circle thereon and capable of effecting rotation of said extension;

stop mechanism secured to the marginal edge portion of said disc means;

means for selectively coupling said spindle extension, disc means, and plate means; and micrometer means mounted to effect fine adjustment of said spindle extension, disc means, and plate means relative thereto.

3. The invention defined in claim 2 wherein said disc means includes an annular array of apertures, and said means for selectively coupling said spindle extension, disc means, and plate means includes pin means adapted to cooperate with selective ones of the aperture of said array.

4. The invention defined in claim 3 including means for securing said pin means to said plate means.

5. The invention defined in claim 1 wherein said spindle extension is tubular.

* * * * *